C. M. BROMWICH.
Lamp.

No. 36,337.  Patented Sept. 2, 1862.

Witnesses:  Inventor:

UNITED STATES PATENT OFFICE.

C. M. BROMWICH, OF BOSTON, MASS.

DRAFT ATTACHMENT FOR LAMP BOXES.

Specification forming part of Letters Patent No. 36,337, dated September 2, 1862.

*To all whom it may concern:*

Be it known that I, C. M. BROMWICH, of Boston, in the county of Suffolk and State of Massachusetts, have invented a new and Improved Draft Attachment for Lamp-Boxes; and I do hereby declare that the following is a full, clear, and exact description of the same, reference being had to the accompanying drawings, making a part of this specification, in which—

Figure 1:
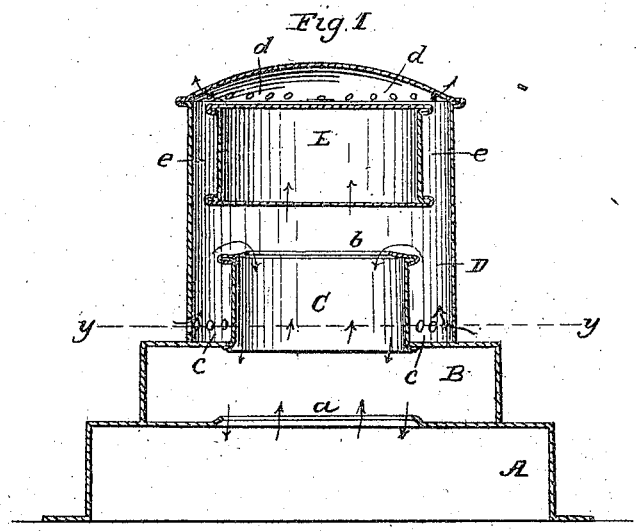
Figure 2:
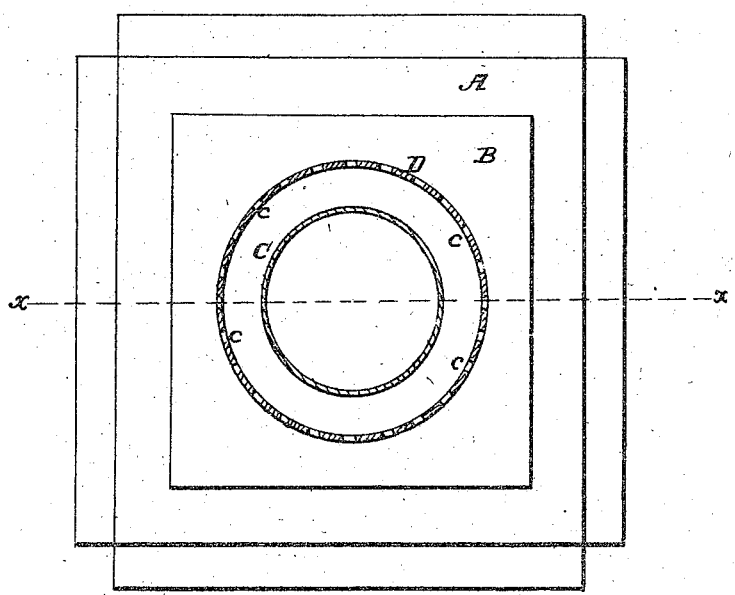

Figure 1 is a central section of my invention, taken in the line $x\,x$, Fig. 2; Fig. 2, a horizontal section of the same, taken in the line $y\,y$, Fig. 1.

Similar letters of reference indicate corresponding parts in the two figures.

This invention relates to an improved arrangement for admitting of the escape of air from the lamp-box and the admission of the external air therein, whereby the supply of air to the flame of the lamp is rendered uniform or constant and the flame allowed to burn without any flickering.

The invention is more especially designed for coal-oil lamps, which require a large amount of air in order to support proper combustion, and the flames of which are very sensitive or susceptible of being influenced by a slight change in the draft.

My invention is admirably well adapted for railroad-car and steamboat lamps, where the vibration attending the movement of said vehicles is liable to affect the flame as well as the fluctuation in the draft caused by the direct communication of the lamp-box with the external air.

To enable those skilled in the art to fully understand and construct my invention, I will proceed to describe it.

A represents a box, which may be of sheet metal and of rectangular or other form. This box is placed upon and secured to the box containing the lamp and communicates directly with it. On the upper part of box A there is placed another box, B, which communicates with A by means of an opening, $a$. The box B has a central elevated chamber, C, smaller in diameter than B, and which is encompassed by a box, D, the lower end of which rests on the top of B, C projecting wholly upward in D and being considerably smaller in diameter, as shown in both figures. The elevated chamber C of the box B communicates with the box D by an opening, $b$, in its top, and the lower part of the box D is perforated all around, as shown at $c$. The upper end of the box D is closed, and is also perforated all around, as shown at $d$, Fig. 1, and within said box D, just below the perforations $d$, there is suspended a box, E, which is somewhat less in diameter than D, so as to admit of a space, $e$, all around between it and D, as shown in Fig. 1.

The box D, as well as the elevated chamber C of box B and the suspended box E in D, may be of cylindrical form, while the boxes A B may be of rectangular form; but I do not confine myself to any particular shape of any of the boxes.

The lamp-box below, in which the lamp is placed, is closed perfectly tight, no air being allowed to enter it at any point, and the box A, as previously stated, is secured to the top of the lamp-box and communicates therewith; hence all the air that enters the lamp-box is from the top and through the device described. The warm air from the lamp-box passes up into box A, through the opening $a$ into box B, up into the elevated chamber C, and thence through the opening $b$ into box D, and is deflected by the bottom of box E (which is perfectly tight and has no communication with D) to the sides of box D and passes out through the perforations $d$. (See black arrows.) The external cold air passes through the perforations $c$ into the lower part of D, and passes upward to the top of C and down through the opening $b$ through the boxes B A into the lamp-box, as shown by the red arrows. The warm air passes centrally up through the boxes, while the cold or fresh air passes downward at the sides of the chamber C and boxes B A, and when warmed and vitiated ascends, its room being filled by the pure descending current. By this arrangement the lamp-box is supplied with a steady uniform draft or current of air, which is produced by the elevation of the box D above the top of the chamber C. The warm air escaping at a higher point than that at which the pure cold air enters, a draft is induced through the openings or perforations $c$. This feature of the invention constitutes its efficiency, for if the eduction openings or perforations $d$ were on a level with $c$ there would be no draft—at least not a strong and efficient one—to supply the flame with a requisite quantity of air. The suspended box or deflector E, in connection with the elevated chamber C, serves, by giving a circuitous route to the ascending and descending currents, to protect the draft from disturbing causes without and render the draft more uniform than it otherwise would be.

Having thus described my invention, what I claim as new, and desire to secure by Letters Patent, is—

The box B, provided with an elevated chamber, C, in combination with a box, D, perforated at its upper and lower part, as shown at $d\ c$, and having a suspended box or deflector, E, within it, all arranged as shown, and used with or without the box A, as and for the purpose herein set forth.

CHARLES M. BROMWICH.

Witnesses:
EDWIN A. SIMONDS,
AARON P. POND.